(No Model.) 2 Sheets—Sheet 1.
W. A. DUTTON & J. F. PFETCH.
MOTOR CAR TRUCK.
No. 517,565. Patented Apr. 3, 1894.
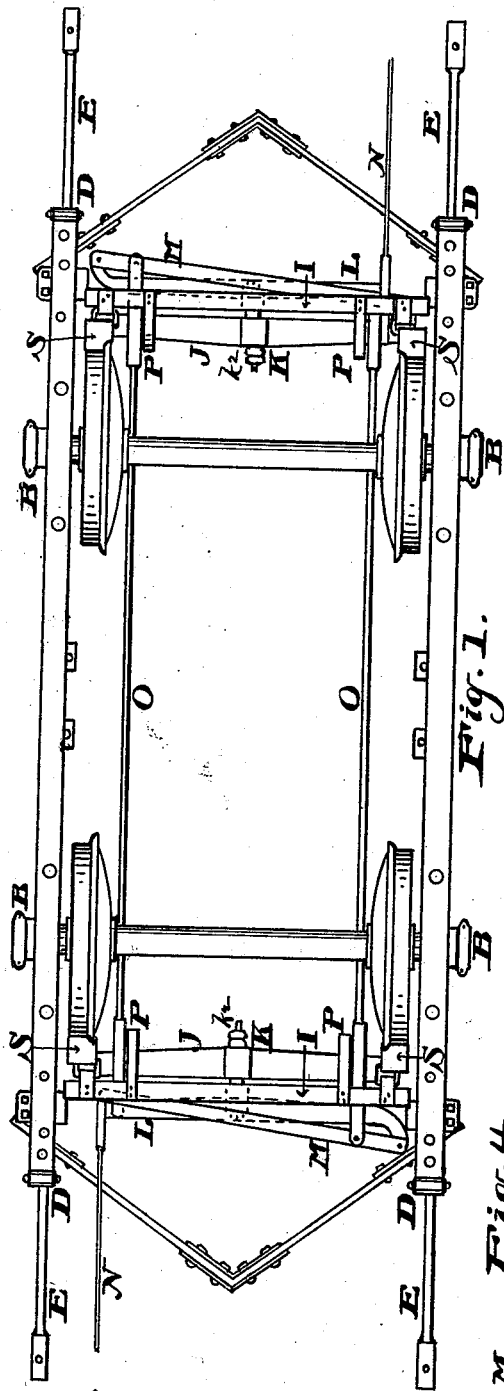
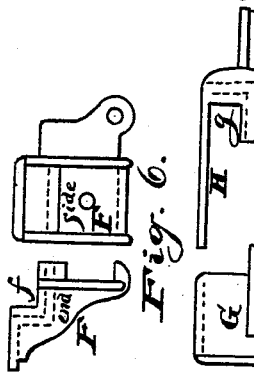
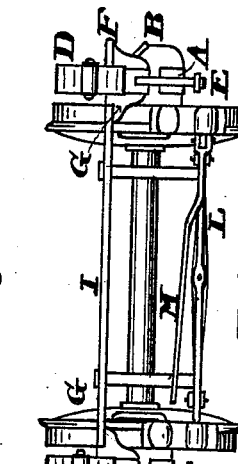
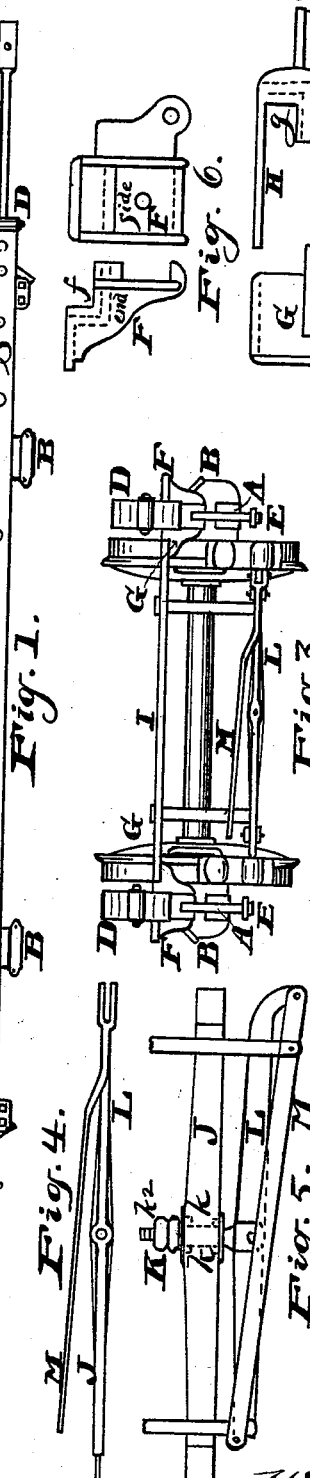
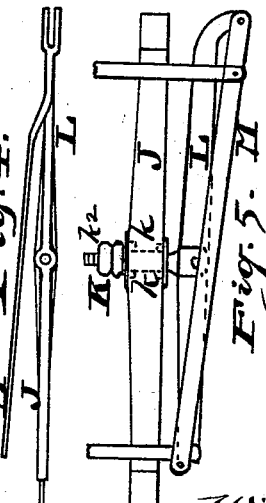
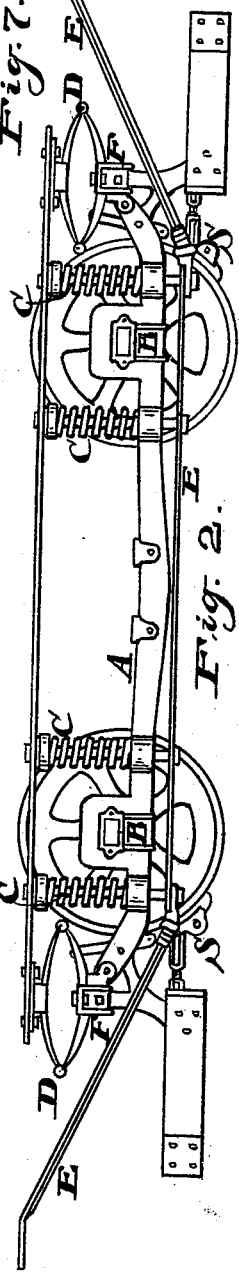
Witnesses
C. M. Burtturs.
F. G. Botsford
Inventors
William A. Dutton
Jacob F. Pfetch
by Geo. W. Tibbitts Atty.
THE NATIONAL LITHOGRAPHING COMPANY,
WASHINGTON, D. C.

(No Model.) 2 Sheets—Sheet 2.

W. A. DUTTON & J. F. PFETCH.
MOTOR CAR TRUCK.

No. 517,565. Patented Apr. 3, 1894.

Witnesses,
C. M. Burttun
F. G. Botsford

Inventors,
William A. Dutton,
Jacob F. Pfetch,
By Geo. W. Tibbitts Atty

UNITED STATES PATENT OFFICE.

WILLIAM A DUTTON AND JACOB F. PFETCH, OF CLEVELAND, OHIO.

MOTOR-CAR TRUCK.

SPECIFICATION forming part of Letters Patent No. 517,565, dated April 3, 1894.

Application filed November 20, 1893. Serial No. 491,504. (No model.)

*To all whom it may concern:*

Be it known that we, WILLIAM A. DUTTON and JACOB F. PFETCH, citizens of the United States, and residents of Cleveland, county of Cuyahoga, and State of Ohio, have invented certain new and useful Improvements in Motor-Car Trucks, of which the following is a specification.

This invention relates to electric motor car trucks, and consists of certain new features of construction and combinations substantially as hereinafter described and pointed out in the claims.

Figure 8:
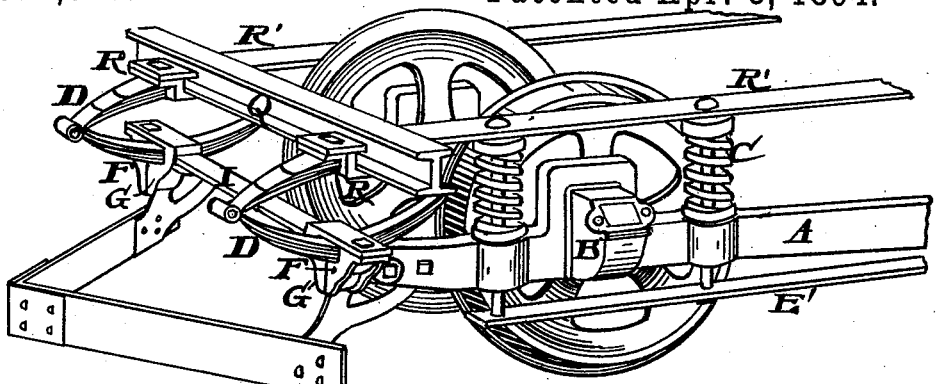
Figure 11:
Figure 12:
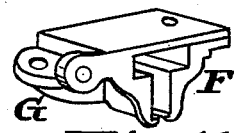
Figure 9:
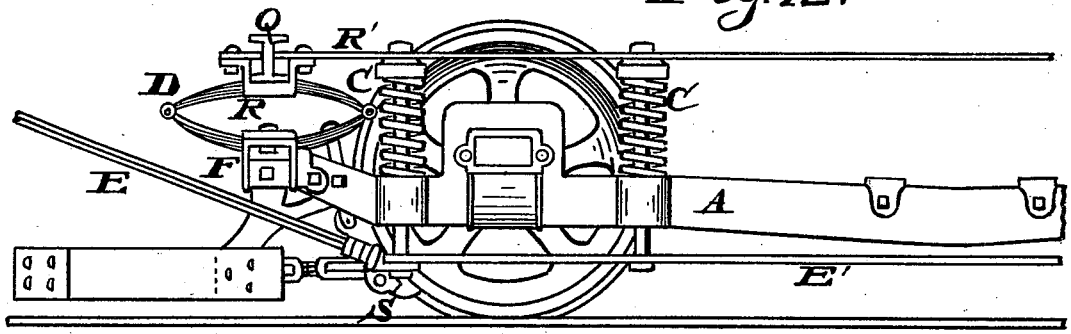
Figure 10:
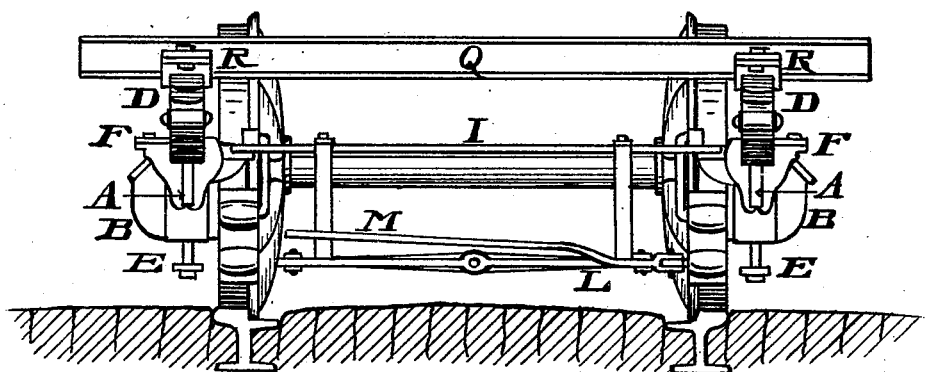

In the accompanying drawings, Sheet 1, Figure 1 is a top or plan view. Fig. 2 is a side elevation and Fig. 3 an end elevation of a truck embodying our improvements. Figs. 4 and 5 are detached views of the brake beams, equalizing bar, and levers connecting the equalizing bars with pull rods, and Figs. 6 and 7 are detached views of the brackets for supporting elliptic springs and cross-bars. Sheet 2, Fig. 8 is a perspective view of one end of the truck showing our improvements. Fig. 9 is a side elevation of the same. Fig. 10 is an end elevation of the same. Fig. 11 is a detached view of the cap which secures the upper part of the elliptic springs to the upper chord or bar of truck frame. Fig. 12 is a detached view of the bracket which secures the lower part of the elliptic springs to the side bars of the truck frame.

A represents the side bars of the truck frame having yokes A' which rest on the journal boxes B, one of said bars forming the main support on each side of the truck. These bars are of a particularly improved construction described as follows:—The central portion of said bars is slightly curved downward from the journal bearings and increased in width to the middle, for the purpose of forming them in truss shape to stiffen and render them capable of resisting the tendency of buckling or bending upward, by the pressure and weight on the outer ends beyond the journal bearings. The outer ends of said bars which support the elliptic springs, are also bent to a point above and beyond the coiled springs for the purpose of elevating said spring and making room for the brace rod E E to reach under and connect with the lower bars or chord E' at their junction with the end coiled-spring bolts. The spiral springs C C are supported in seats formed in the side bars at each side of the yokes A' in the usual manner.

D D are elliptic springs supported on the ends of the side bars A, by means of brackets F G, consisting of two castings, seen in detached views Figs. 6, 7, 11, and 12, bolted or riveted to the bars, each of said castings having one half of the recess for forming the seat for the springs to set in, seen at $f\,g$.

H is an arm cast with a bracket G which extends over the top of bracket F covering the recess $f\,g$ and serves to confine the springs D in place, one bolt securing the end of said extension arm to the bracket F.

I I are cross bars which join the two opposite brackets at each end of the truck.

J J are iron brake-beams joining the brake shoes S S that are suspended by links from ears on the bracket G. These beams are forged with a thickened middle portion, having eyes for bolts K K, in the bifurcated heads of which are pivoted the equalizing bars L L. The bolts are secured in the beams by means of nuts $k\,k$, having shoulders, and are set in recesses at front and rear sides of the bars, and by jam nuts $k^2$, the object of which is to relieve the screw-threads on the bolts from wear by jarring, the nuts $k\,k$ taking such wear.

The equalizing bars have one curved end, to which are pivoted one end of the levers M M; the other or moving ends of which have the pull-rods N N attached, that connect them with the hand crank shafts on the car platform. (Not shown.)

O O are rods having long bifurcated ends $p\,p$ which embrace the brake beams, and connect the equalizing bars and lever M M at one end of the truck with those of the other end whereby the pulling on the said rods N N exerts great force through the arrangement of levers on the brake shoes.

In Figs. 9, 10, and 11, are shown cross-beams Q whose ends project over the spring D and are provided for adapting the truck to wide car bodies; these cross beams are supported in recesses in the upper part of the caps R, which secure the upper half of the elliptic springs D to the upper bar or chord of the truck frame. The caps R have cross mortises through which the upper half of the springs are inserted, and when bolted or riveted to the upper bar or chord, serve to fasten the springs, chords and bars firmly together.

Having described our invention, we claim—

1. The side bars for car trucks having the journaled yokes integral therewith, and the ends of said bars bent inclinatorily upward, for supporting the elliptic springs on a higher plane, substantially as described.

2. In a car truck the combination with the side bars having their middle portions between the journal bearings forged in truss form, and their ends bent upward inclinatorily; of elliptic springs supported on the ends of said bars, the brackets bolted or riveted to said bars, and adapted to clamp the springs thereon, substantially as described.

3. A side bar for car trucks, having its middle part bent downward and of greater depth than its remaining part and its ends bent inclinatorily upward, substantially as described and for the purposes specified.

4. In a car truck, the combination with the side bars, of brackets secured to the ends thereof, each of said brackets being made in two parts formed with recesses arranged to provide an opening when said two parts are together, elliptical springs seated in said openings, and arms, each projecting from one of said parts of the bracket over said opening to the other member of the bracket, said arms confining the springs to their seats, substantially as shown and described.

5. In a car truck the combination with the side bars having the middle portions between the journal bearings forged in truss form; elliptic springs supported on the ends of said side bars, brackets bolted or riveted to said bars, and clamping the same to the bars, cross bars joining two opposite brackets at each end of the truck, recess caps bolted or riveted to the upper chord or sill-plate, and the cross beams supported in said caps at each end of the truck, substantially as described.

6. In a car truck, the combination with the side bars having their ends extending inclinatorily upward, and the elliptical springs supported on said ends, of coiled springs, bolts encircled by said coiled springs and extending through said side bars, and inclined rods E' and horizontal rods E' having their adjacent ends secured to the lower ends of said bolts, substantially as shown and described.

7. In a car truck, the combination with the side bars, and elliptical springs supported thereon, of the upper bars, cross beams projecting over said springs, and caps, secured to said upper bars and having mortises to receive the ends of said cross beams and the upper parts of said elliptical springs, substantially as described and for the purposes specified.

8. The combination with a car truck, the brake shoes and the brake beams, of equalizing levers, L L, attached to said brake beams, levers, M M, each pivoted at one end to an end of an equalizing lever, the connecting rods, O O, joining the levers M L at one end of the truck with the corresponding levers at the other end thereof, and pull rods N N, substantially as shown and for the purposes specified.

WILLIAM A. DUTTON.
JACOB F. PFETCH.

Witnesses:
GEO. W. TIBBITTS,
JOHN C. TALCOTT.